United States Patent [19]

Sterner

[11] Patent Number: 4,493,426

[45] Date of Patent: Jan. 15, 1985

[54] ATTACHMENT JIB FOR CRANES

[75] Inventor: Russell L. Sterner, Greencastle, Pa.

[73] Assignee: Kidde, Inc., Saddle Brook, N.J.

[21] Appl. No.: 310,768

[22] Filed: Oct. 13, 1981

[51] Int. Cl.[3] ...................... B66C 23/04; B66C 23/56; B65G 9/04

[52] U.S. Cl. .................................... 212/261; 212/264; 414/607; 182/2

[58] Field of Search ................ 414/607; 212/168, 206, 212/230-232, 238, 260, 261, 264, 266-268; 182/2

[56] References Cited

U.S. PATENT DOCUMENTS

| | | | |
|---|---|---|---|
| 2,969,849 | 1/1961 | Grant | 182/2 |
| 3,036,718 | 5/1962 | Koivula | 212/168 |
| 3,710,893 | 1/1973 | Hippach | 182/2 |
| 3,773,200 | 11/1973 | Morris | 414/607 |
| 3,907,142 | 9/1975 | Welch | 414/607 |
| 3,945,333 | 3/1976 | Fritsch et al. | 212/230 |
| 4,106,631 | 8/1978 | Lundy | 212/231 |
| 4,159,059 | 6/1979 | Christenson et al. | 414/607 |
| 4,241,837 | 12/1980 | Suverkrop | 212/231 |
| 4,260,064 | 4/1981 | Ekstom | 215/2 |
| 4,274,793 | 6/1981 | Frey-Wigger | 414/607 |

FOREIGN PATENT DOCUMENTS

| | | | |
|---|---|---|---|
| 2515562 | 10/1976 | Fed. Rep. of Germany | 414/607 |
| 136492 | 7/1979 | German Democratic Rep. | 212/266 |
| 956437 | 4/1964 | United Kingdom | 414/607 |
| 1440874 | 6/1976 | United Kingdom | 182/2 |
| 1572440 | 7/1980 | United Kingdom | 182/2 |
| 2041326 | 9/1980 | United Kingdom | 212/264 |

*Primary Examiner*—Trygve M. Blix
*Assistant Examiner*—R. B. Johnson
*Attorney, Agent, or Firm*—Brady, O'Boyle & Gates

[57] ABSTRACT

An attachment jib for supporting various working devices, such as a pipe manipulator, includes a support base which can be rigidly coupled removably with existing elements on the nose block of a telescopic crane boom. The jib includes telescopic sections and its base section is pivotally mounted on the support base and is luffed by power cylinders on such base through a wide angle. The jib contains another power cylinder to control extension and retraction of its fly section carrying the working device. An optional work support platform pivotally connected to the support base may be used either with or without the jib.

4 Claims, 7 Drawing Figures

ATTACHMENT JIB FOR CRANES

BACKGROUND OF THE INVENTION

Attachment jibs for crane booms including telescoping booms are known in the art and exist in a number of forms. Generally, such booms are employed to increase the normal maximum length of the boom so that higher elevations may be reached. The known jibs are quite limited in their utility and an example of their limited use is to place a relatively light load on the roof of a building whose height is within the reach of the jib when the crane boom on which the jib is mounted is extended.

With the above in mind, it is the object of this invention to provide a far more versatile attachment jib for cranes which includes a more stable, secure and convenient mounting base which is removably attachable to existing shaft elements found on the nose block of most telescoping boom construction cranes.

Another object is to provide an attachment jib having its own boom which is extensible and retractable and which may be luffed through a wide angle to enable a more efficient utilization of different working devices which can be supported by the jib.

Another object is to provide an attachment jib of the above-mentioned type whose extending and luffing hydraulic cylinders may be conveniently operated by the hydraulic system of the crane.

Still another object is to provide an attachment jib having an optional worker support which remains level under the influence of gravity and which, when used, places the worker close to the controls for the jib and working implements carried by the jib.

Other features and objects of the invention will become apparent during the course of the following detailed description.

DETAILED DESCRIPTION

Figures 1, 7:
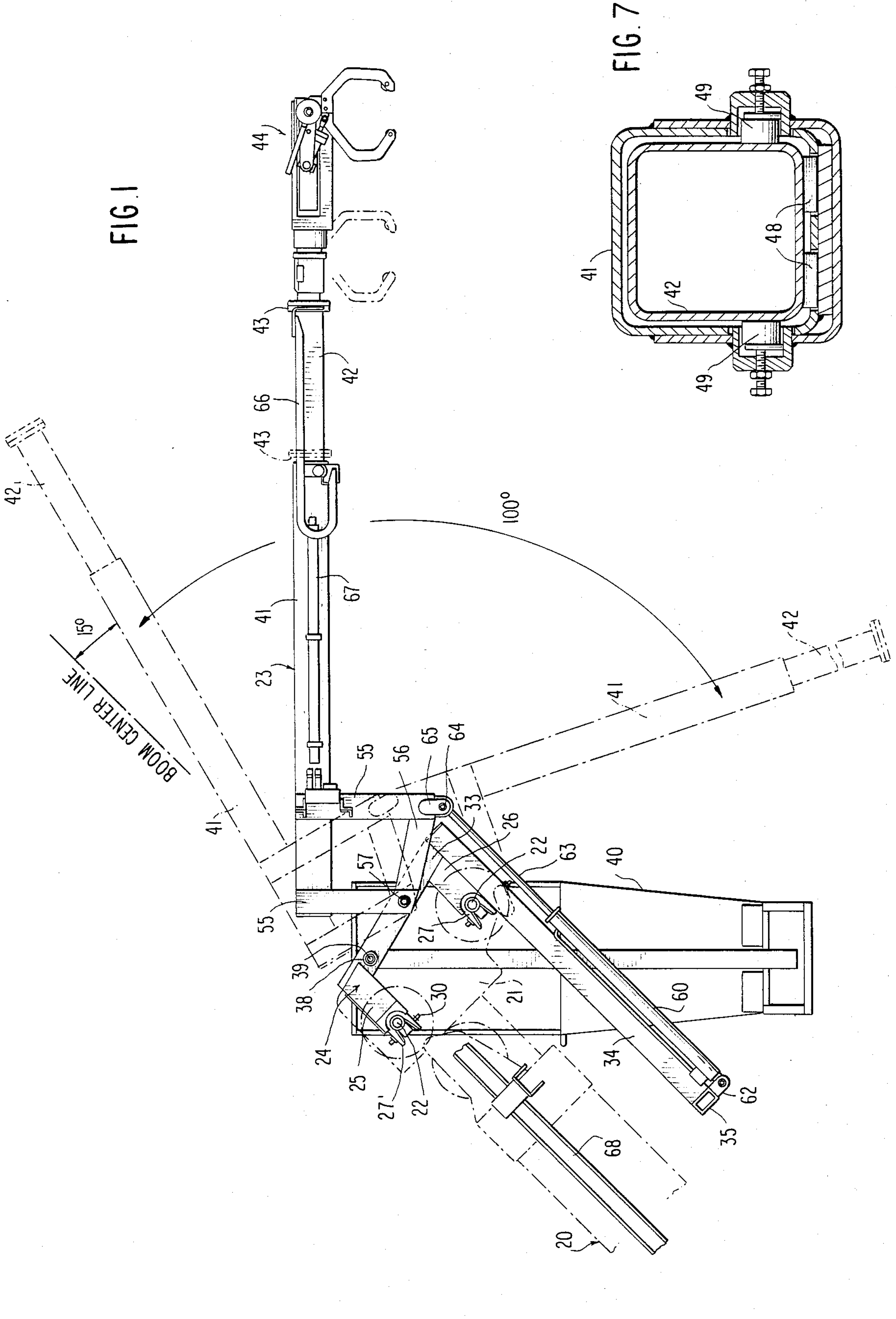
FIG. 1 is a side elevation of an attachment jib for construction cranes according to the invention.
FIG. 7 is an enlarged transverse vertical section through the telescopic jib taken on line 7—7 of FIG. 6.

Referring to the drawings in detail wherein like numerals designate like parts, the numeral 20 designates a conventional hydraulically operated telescopic crane boom which may be extended and retracted and luffed and slued in the customary manner. The fly section of the crane boom 20 carries a nose block 21 having a pair of customary parallel cross shafts 22 for the support of sheaves when the attachment jib is not being employed. These cross shafts are employed as the primary support elements for the attachment jib forming the subject matter of the invention and indicated in its entirety in FIG. 1 by the numeral 23.

Figure 3:
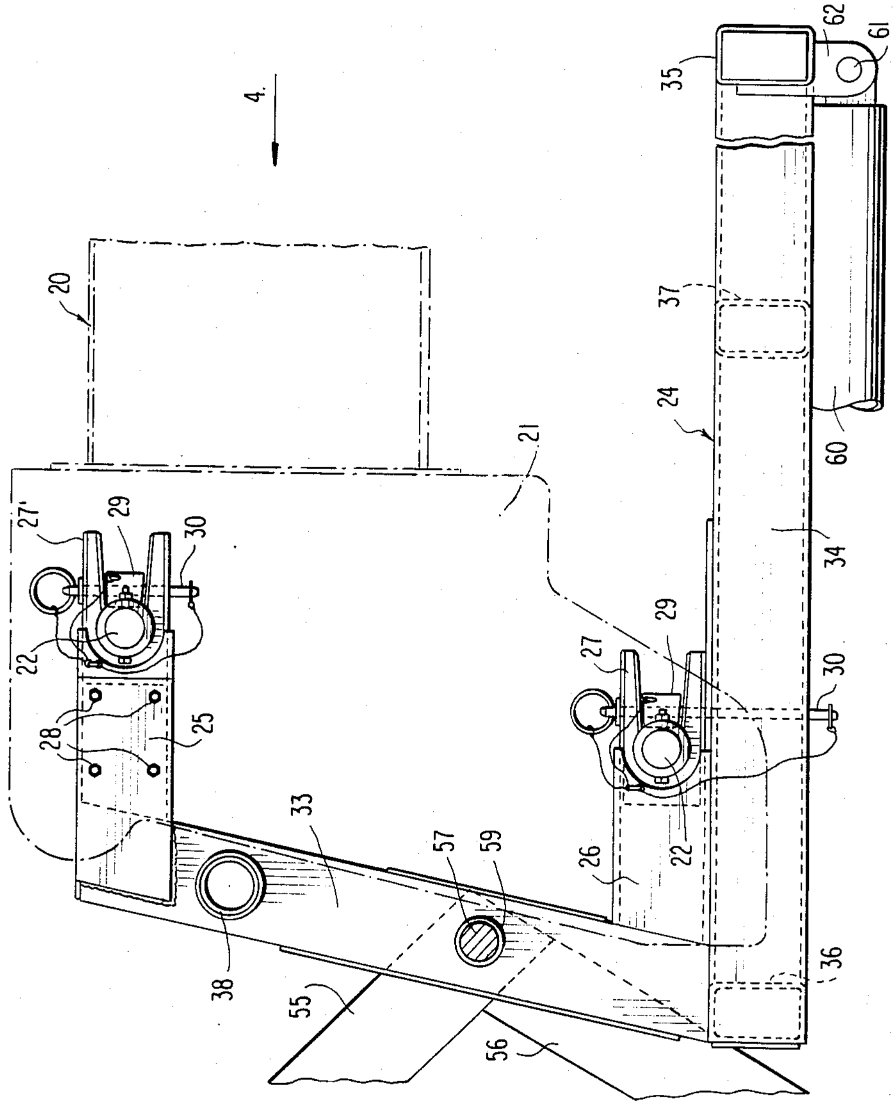
FIG. 3 is an enlarged vertical section taken on line 3—3 of FIG. 4.

The attachment jib comprises a support base 24 of rigid construction which includes upper and lower laterally spaced parallel arms 25 and 26 which can straddle the nose block 21 adjacent to its shafts 22. The lower arms 26 have bifurcated anchors 27 socketed therein and welded into place fixedly. Corresponding bifurcated anchors 27' of the upper arms 25 are socketed therein for limited adjustability and are secured in place by bolts 28. The bifurcated anchors 27 and 27' whose walls are divergent engage easily over the opposite end portions of shafts 22 and are locked in place by wedge blocks 29, in turn secured by tethered removable locking pins 30. The blocks 29 are also tethered, as shown in FIG. 3, to prevent their total separation from the support base 24.

Figure 4:
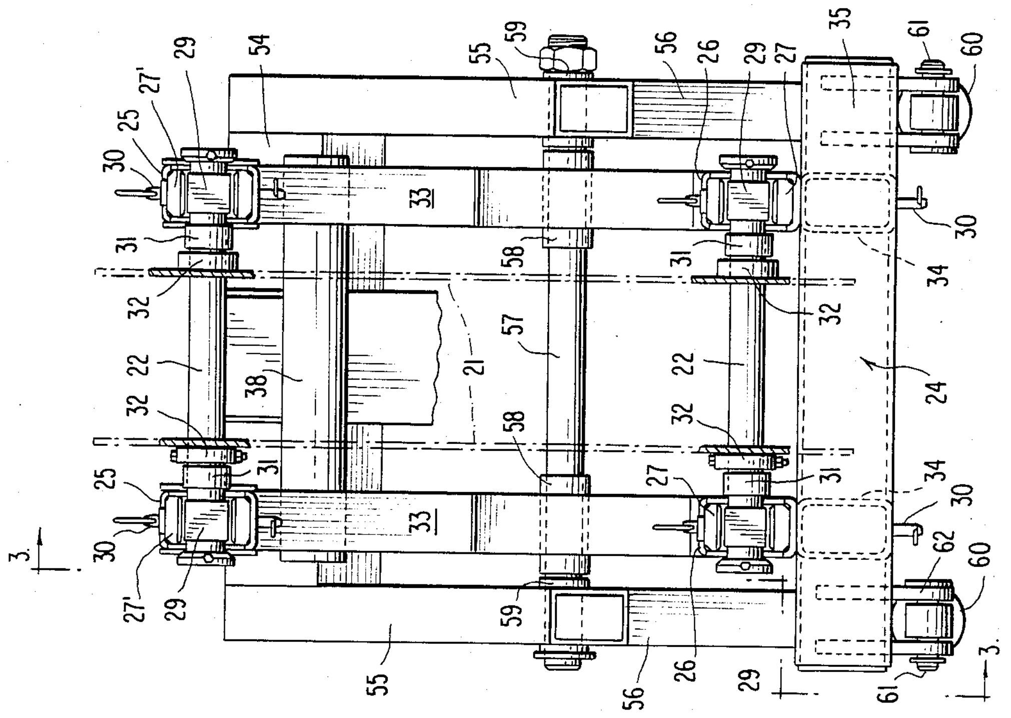
FIG. 4 is an elevational view, with parts in section, of the elements shown in FIG. 3 looking in the direction of the arrow 4.

Referring to FIG. 4, spacer sleeves 31 and collars 32 are placed on the two shafts 22 between the side walls of nose block 21 and the arms 25 and 26 to achieve proper centering of the attachment jib relative to the crane boom 20.

The support base 24 further comprises spaced parallel members 33 rigidly interconnecting the arms 25 and 26 and being further rigidly secured at their lower ends to elongated parallel bars 34 which underlie the arms 26 and are secured thereto. At their rearward ends, the bars 34 are rigidly interconnected by a cross member 35 of greater length than the distance between the members 33 so that opposite end portions of the member 35 project equidistantly outwardly of the members 33 and the arms 25 and 26 secured thereto. A cross brace 36 between the bars 34 is provided at their opposite ends and an intermediate cross bar 37, FIG. 3, may also be provided for increased rigidity in the support base.

Near and below the arms 25 a tube 38 is fixed within openings formed in the members 33 and extends between these members at right angles thereto as best shown in FIG. 4. The tube 38 is adapted to receive a shaft 39 therethrough, shown in FIG. 1 only, by means of which a worker supporting basket 40 may be suspended pendulum-like from the tube 38 with safety and security. The basket 40 can be omitted entirely, when desired.

The attachment jib additionally comprises a jib body or base 41 having an extensible and retractable telescoping fly section 42 carrying at its leading end an adapter flange 43 through which various working devices may be attached to and operated by the jib 23. For example, as shown in FIG. 1 of the drawings, a pipe handling device 44 may be attached to the flange 43 of the telescoping fly section 42 of the jib, the latter being extended and retracted by a hydraulic cylinder 45 inside of the telescoping jib and having connections at 46 and 47 with its base and fly sections 41 and 42. As shown in FIG. 7, the telescoping jib sections are stabilized and guided by suitable wear pads 48 at its lower side and by adjustable pads 49 at its opposite vertical sides.

Figure 2:
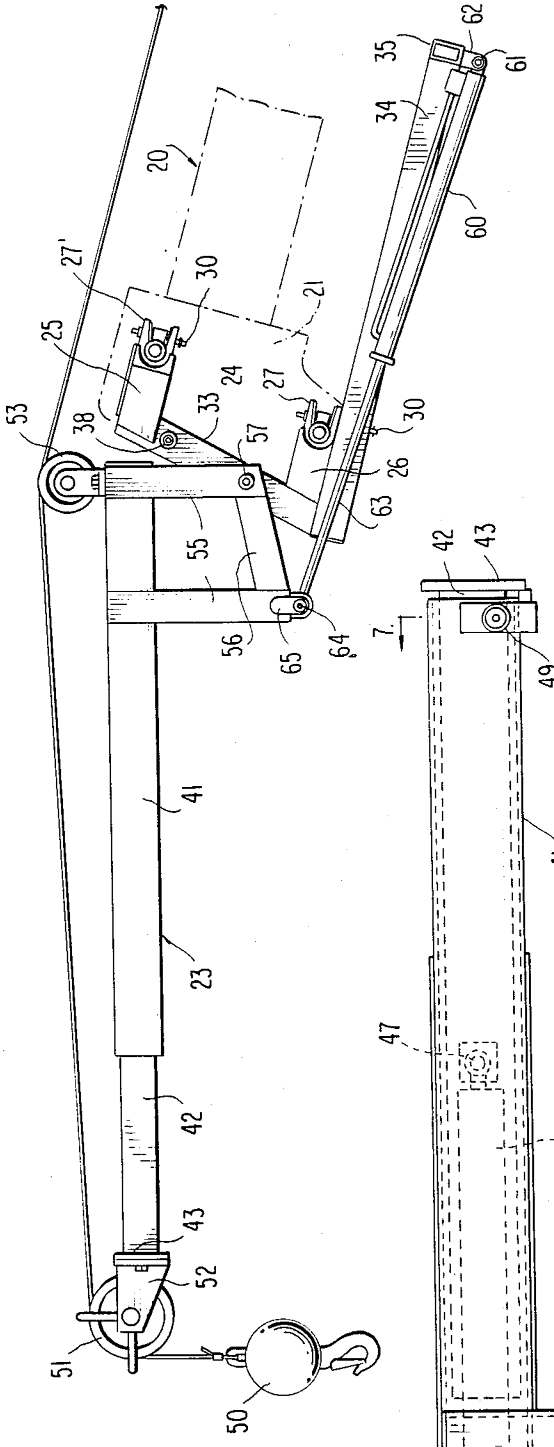
FIG. 2 is an opposite side elevation of the attachment jib showing its use with a different form of working device from that depicted in FIG. 1.

FIG. 2 of the drawings shows another utilization of the attachment jib 23 in which a headache ball 50 and hook are suspended by a cable from a sheave 51 attached by a support bracket 52 from the adapter flange 43 of the jib, a further guide sheave 53 for the cable being provided at the rear of the jib on its top to prevent interference of the cable with the crane boom 20.

The base section or body 41 of the attachment jib is fixed to and rigid with a pair of spaced parallel cross arms 54 which project equidistantly beyond the opposite sides thereof near the rear end of base section 41. The ends of these cross arms are rigidly secured to descending parallel bars 55 whose lower ends are rigidly interconnected by somewhat inclined bars 56. It can be seen that the elements 54, 55 and 56 form a rigid unitary approximately rectangular box frame whose sides consisting of the bars 55 are spaced laterally outwardly of the parallel bars 33 of support base 24, see FIG. 4.

Figure 6:
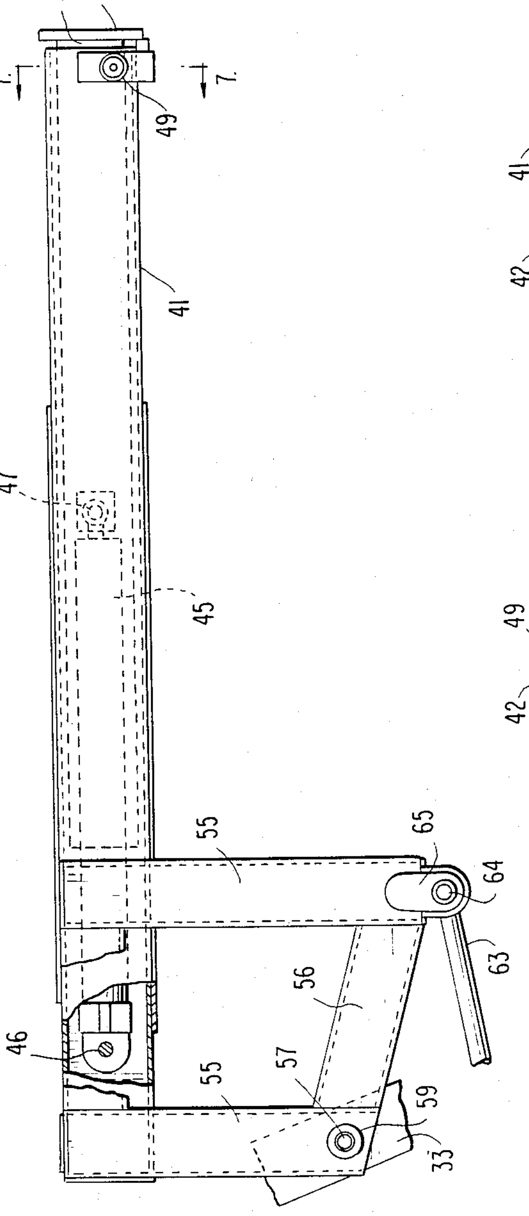
FIG. 6 is a side elevation, partly in section of the elements shown in FIG. 5.
Figure 5:
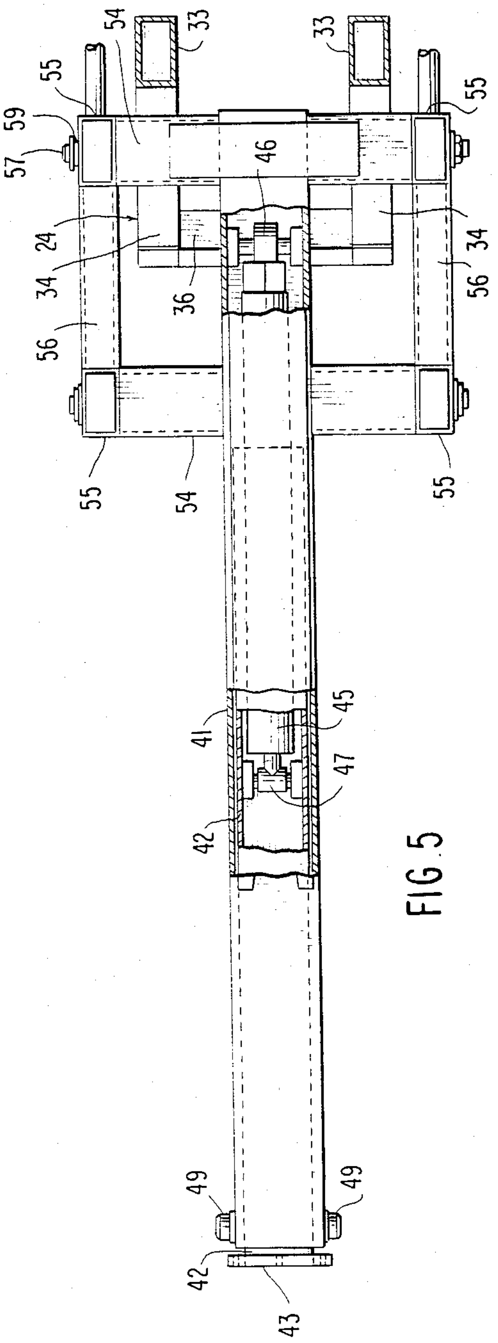
FIG. 5 is a plan view, partly in section, of the attachment jib and its supporting base.

A luffing pivot for the attachment jib 23 is formed by a sturdy pivot shaft 57 whose axis is parallel to the shafts 22 and tube 38. This pivot shaft is held in bearing sleeves 58 on the members 33 of the jib support base 24. The shaft 57 extends through pivot bearings 59 of the frame composed of the bars 55 and 56, above-described, at the rear lower corner of this box-like frame, see FIGS. 1 and 3. By means of the box-like pivoting frame for the attachment jib 23, the luffing pivot axis defined by the shaft 57 is placed well below the longitudinal axis of the telescoping jib sections 41 and 42. This arrangement facilitates a very wide angle luffing of the attachment jib through an angle as great as 100 degrees downwardly from an elevated position 15 degrees below the center line of the crane boom 20, FIG. 1, as an example Luffing of the jib is achieved by the operation of a pair of spaced parallel hydraulic luffing cylinders 60 whose cylinder bodies are pivotally connected at 61 to depending anchors 62 on the opposite ends of cross member 35. The rods 63 of cylinders 60 are similarly connected at 64 to anchors 65 attached to the lower ends of frame bars 55, as best shown in FIG. 6. Referring to FIG. 4, the wide stance arrangement of the luffing cylinders 60 and the frame members 55 and 56 outside of the framework of the supporting base 24 gives great strength and stability to the jib mounting and enables it to carry substantial loads without twisting and swaying laterally. The provision of the long member 35 at the rear ends of the parallel bars 34 is important in this respect, that is, lateral stability.

As shown and described, the connections of the rods 63 of the luffing cylinders with the jib are at the lower forward corners of the framework composed of elements 55, 56 and 54 and spaced ahead of and below the axis of pivot shaft 57. This geometry also contributes to the generous luffing angle of the jib For completeness and to avoid loose hanging hydraulic lines and cables, the jib 23 can be equipped with a conventional Powertrack 66, FIG. 1, forwardly of a fixed conduit 67 on one side of the jib. Other types of guide and support means for flexible elements could be used. A further Powertrack 68 or the like can be placed on one side of the crane boom 20, as shown in FIG. 1.

In connection with the drawing figures, it will be understood that crane boom 20 is at an elevated angle in FIG. 1, at a shallower angle in FIG. 2, and horizontal in FIG. 3. In use, the crane boom 20 is positioned in various ways, depending on the nature of the particular working device being utilized on the attachment jib and other variables. The jib proper is extended and retracted and luffed as needs dictate, either by an operator in the basket 40 or remotely from the cab of the crane.

It is to be understood that the attachment support base 24 can carry the worker supporting basket 40 alone pivotally connected thereto in pendulum-like suspension, as indicated in FIG. 1, without a luffing jib to provide a worker support attachment for a crane boom nose assembly that is readily attachable and releasable from the parallel shafts 22 thereof. The support base may also carry a workman support platform pivotally connected thereto in another position, other than that shown in FIG. 1 at 38 and 39.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. An attachment jib for a crane boom comprising a support base adapted to be releasably coupled with a pair of existing parallel shafts on a crane boom, said support base comprising a frame having spaced opposite side arms adapted to straddle the nose block of a crane boom and the arms having engaging elements at their ends adapted to be releasably locked in engagement with said existing projecting shafts on opposite sides of the nose block, a jib structure including at least one extensible and retractable section, a separate hydraulic cylinder inside said jib structure operable to extend and retract said section, a framework carrying the jib structure and projecting from one end thereof near the base of the jib structure, said framework comprising a box-like frame having one corner thereof pivotally connected to the support base between said side arms and spaced from the longitudinal axis of the jib structure, an adapter element at the leading end of said jib structure adapted to be releasably coupled to a mating adapter element of various working devices, and hydraulic luffing cylinder means mounted on the support base and connected to a second corner of said box-like frame on one side of the support base in spaced relationship to the pivot axis of said box-like frame, whereby the attachment jib can be pivoted through a very wide luffing angle.

2. An attachment jib for a crane boom as defined in claim 1, wherein said side arms include bifurcated anchors adapted to straddle the end portions of said pair of existing parallel shafts on said crane boom, and means to releasably lock the bifurcated anchors in engagement with said shafts.

3. An attachment jib for a crane boom as defined in claim 1, wherein the hydraulic luffing cylinder means comprises, a pair of hydraulic cylinders, and a pair of support members for the hydraulic cylinders on the support base in substantially the same planes occupied by the side arms and projecting beyond correponding ends of the arms.

4. An attachment jib for a crane boom as defined in claim 2, wherein said means to releasably lock the bifurcated anchors comprises, tethered block elements engageable between the bifurcations of the anchors to retain the anchors engaged with said shafts, and tethered locking pins removably engated with the bifurcations and blocks to retain the blocks in their operative positions relative to the shafts and anchors.

* * * * *